April 12, 1949.  Z. C. BIRNBERG  2,467,076
WHEELED GOLF BAG CARRIER
Filed March 22, 1947  2 Sheets-Sheet 1
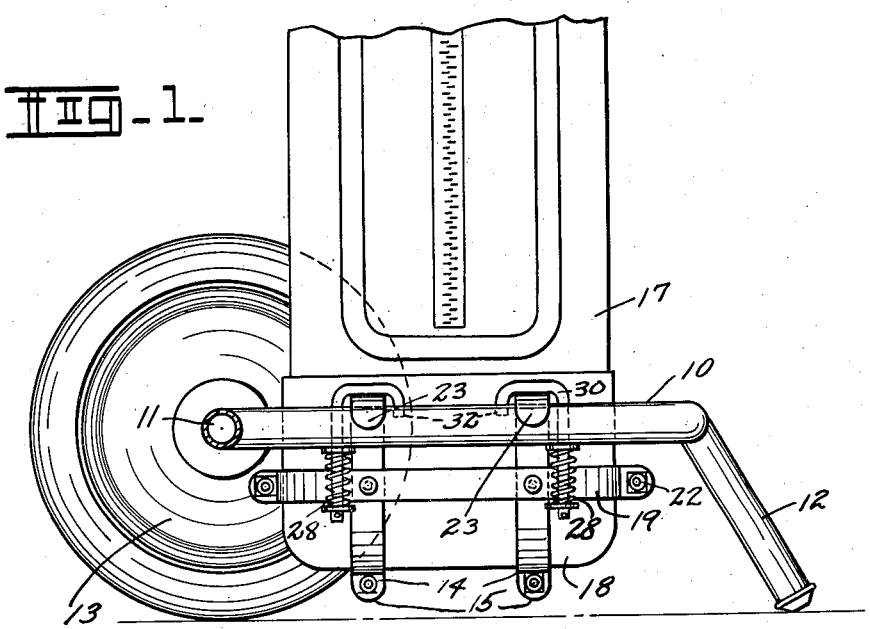
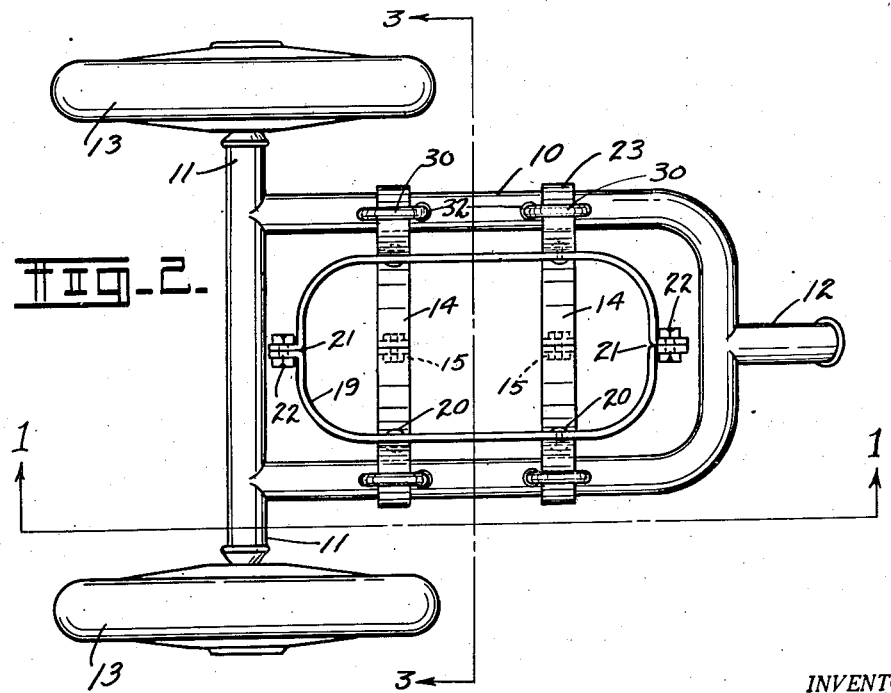
INVENTOR.
Zingel C. Birnberg.
BY W B Harpman
ATTORNEY.

April 12, 1949. Z. C. BIRNBERG 2,467,076
WHEELED GOLF BAG CARRIER
Filed March 22, 1947 2 Sheets-Sheet 2
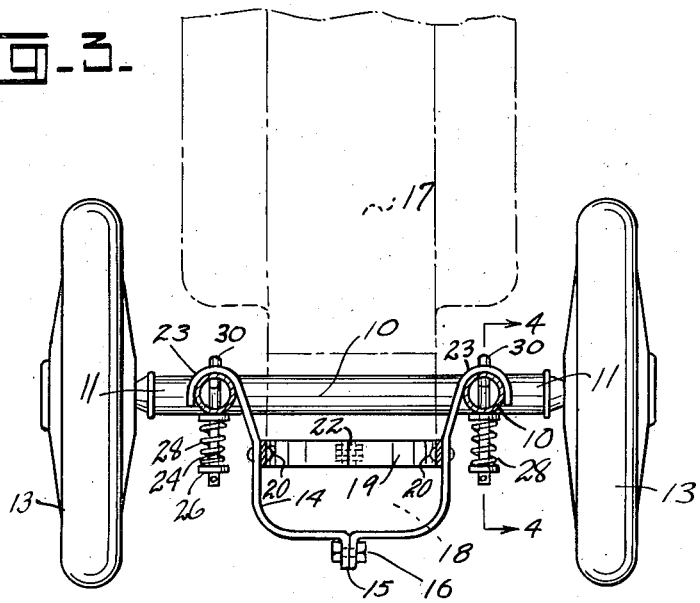
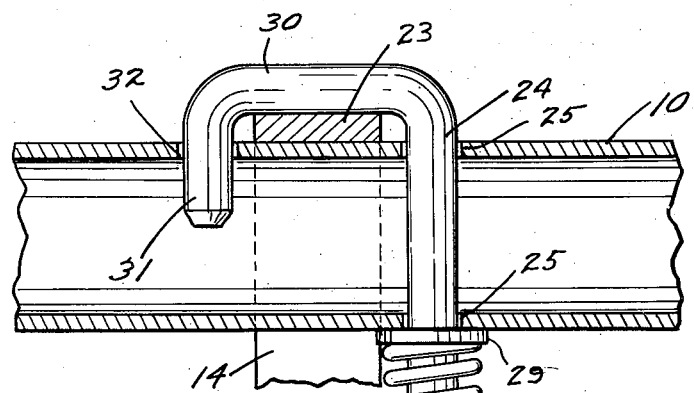
INVENTOR.
Zingel C. Birnberg.
BY W. B. Harpman
ATTORNEY.

Patented Apr. 12, 1949

2,467,076

UNITED STATES PATENT OFFICE 2,467,076

WHEELED GOLF BAG CARRIER

Zingel C. Birnberg, Youngstown, Ohio

Application March 22, 1947, Serial No. 736,510

2 Claims. (Cl. 280—61)

This invention relates to a golf bag vehicle and more specifically to a vehicle adapted to support a golf bag in vertical position therein.

The principal object of the invention is the provision of a golf bag vehicle incorporating means for carrying a golf bag as a structural portion of the vehicle.

A further object of the invention is the provision of a golf bag vehicle having means conveniently attachable to a golf bag so that the same may be retained therein.

A still further object of the invention is the provision of a golf bag vehicle adapted to support a golf bag in underslung relationship to the majority of the said vehicle.

A still further object of the invention is the provision of a golf bag vehicle in which various sizes of golf bags may be readily positioned and retained thereby.

The golf bag vehicle shown and described herein has been designed to form a lightweight device which may be attached to a conventional golf bag and thereby make it a relatively simple task to move the golf bag about a golf course, for example, by using the golf bag itself as a handle for the manipulation of the same on the wheeled vehicle which, once attached to the golf bag, becomes for all practical purposes an integral part thereof. In addition, the golf bag vehicle serves as a stand for the golf bag holding it erect so that golf clubs may be easily taken therefrom or placed therein. The vehicle itself comprises frame and wheel members and a supporting yoke for the golf bag which is adapted to be hung from appropriately formed portions of the vehicle. Means is also provided for removably attaching the golf bag supporting yoke to the remainder of the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation with parts in cross section illustrating the golf bag vehicle and a golf bag positioned thereon.

Figure 2 is a top plan view of the golf bag vehicle. Line 1—1 on Figure 2 indicates the cross section of Figure 1.

Figure 3 is a cross section taken on line 3—3 of Figure 2.

Figure 4 is an enlarged detailed cross section taken on line 4—4 of Figure 3.

By referring to the drawings and Figures 1 and 2 in particular it will be seen that a golf bag vehicle of extremely light weight construction has been disclosed and comprises a generally rectangular frame 10 having projecting axle sections 11 on one end thereof and a downwardly inclined and projecting arm 12 on the other end thereof. The generally rectangular frame 10, the axle sections 11 and the arm projection 12 are preferably formed of thin wall, light weight, metallic tubing, the several sections of which may be easily fabricated and the assembly formed as by welding, or brazing the sections to one another. Wheels 13 are positioned one on each of the axle extensions 11 and are of a height so that the front end of the generally rectangular frame 10 is supported on an even horizontal plane, the opposite or back end portion being supported by the arm 12.

In order that the rectangular frame 10 can be used to position a golf bag, a two-part yoke is provided and is hooked over the side rails of the frame 10 and comprises, in assembly, a pair of U-shaped members 14, each of which is formed in two parts and bolted together at their bottommost ends 15 as by bolt and nut assemblies 16. The arms of the U-shaped members 14 are turned outwardly and downwardly adjacent their end sections to form hooks registrable with the side members of the rectangular frame 10 as shown in Figures 1, 2 and 3.

It will be noted by referring to Figures 2 and 3 of the drawings in particular, that the members 14 are of sufficient width to receive the bottom capped end portion of a golf bag therein. The golf bag is indicated by the numeral 17 and the capped lower end portion thereof by the numeral 18. It will be obvious to those skilled in the art that the effective width of the members 14 may be varied to correspond with the various sizes of golf bags as the rectangular frame 10 is sufficiently wide to receive any of the several sizes of golf bags therein in underslung relation thereto as supported by the yoke formed of the members 14.

In order that the members 14 may be held in desirable position in the rectangular frame 10 and beneath the golf bag 17, and more particularly the capped lower end 18 thereof, an annular band 19 is positioned horizontally on the arms of the members 14 and riveted or otherwise affixed thereto, as shown in the drawings, the rivets being indicated by the numerals 20. The band 19 is preferably formed of a pair of similarly formed members bolted together at their ends 21 by means of nut and bolt assemblies 22. It will be obvious to those skilled in the art that if desired the members 14 and the band 19 may be formed as single structural members rather than of two-part assemblies as shown. In either case, the resulting yoke will fit in the area defined by the rectangular frame 10 and be suspended therefrom by reason of the hooks formed on the upper end of the arms of the members 14, the hooks being indicated in the drawings by the numerals 23.

It will be obvious that the principal reason for the formation of the annular band 19 and the members 14 as two-part constructions is to enable the same to be clamped about the capped lower end 18 of the golf bag. For example, when the golf bag is first positioned in the yoke formed of members 14 and the band 19, the bolt and nut assemblies 15 and 22 are loosened to expand the yoke structure and then tightened again to securely clamp the yoke to the bottom capped portion 18 of the golf bag 17. The golf bag, complete with the yoke attached thereto, may then be positioned in the remainder of the golf bag vehicle and in the area defined by the rectangular frame 10 so that the hooks 23 of the yoke structure engage the side members of the rectangular frame 10 and thereby support the yoke in proper position therein.

It will be observed that the over-all depth of the yoke construction and particularly that of the members 14 is less than the height of the arm 12 or the effective height of the wheels 13. It will also be observed that the lower portion 18 of the golf bag 17 is positioned in underslung relation to the frame 10, thus lending stability to the device.

In order that the yoke carrying the golf bag 17 may be suitably attached to the remainder of the golf bag vehicle, and in particular to the rectangular frame 10, spring tensioned clamping means is provided and is illustrated in the several figures of the drawings and in enlarged detail in figure 4.

By referring now to Figure 4 of the drawings it will be seen that the clamping means comprises a vertically disposed bar 24 positioned in appropriately formed openings 25 in the rectangular frame 10 and the lower portion of the bar 24 extending below the frame member 10 and provided near its end section with a washer 26 retained thereon by means of a cotter pin 27 positioned through an opening in the bar 24. A coil spring 28 is positioned on the washer 26 and about the depending portion of the bar 24 and a secondary washer 29 is positioned in the uppermost end of the spring 28 and adjacent the lower surface of the frame 10. The uppermost end of the bar 24 is bent horizontally, as indicated by the numerals 30 and the outer end 31 thereof is turned downwardly to form a modified U-shape of sufficient size to be positioned over the hook 23 of the yoke asembly. An opening 32 formed in the uper surface of the frame 10 is adapted to receive the downturned portion 31 so that the clamping members formed by the bar 24 may be retained in appropriate position. It will be obvious that the spring 28 normally biases the clamping member formed by the bar 24 into clamped position and that in order to remove the golf bag and yoke assembly from the vehicle, the clamping members must be manually released.

It will thus be seen that a simple and practical golf bag vehicle has been disclosed which is characterized by its light weight, simple construction, its ease of attachment to a golf bag and its ability to support the golf bag in standing position or to carry it when the same is rolled along.

Having thus described my invention, what I claim is:

1. A golf bag vehicle including a rectangular frame having wheel carrying projections on one end and an inclined ground engaging arm on the other end, wheels on the wheel carrying projections and a horizontally positioned adjustable band-like yoke including vertically positioned arms detachably affixed thereby to the said frame and positioned in the area defined thereby and in underslung relation thereto, the said yoke forming means for receiving and retaining a golf bag, and means for holding the said yoke in position on the said frame, said means including manually operable clamping members.

2. A golf bag vehicle comprising a horizontally disposed frame having axle projections formed thereon, wheels on the said axle projections and a rearwardly inclined ground engaging arm formed on the said frame and adapted with the said wheels to support the said frame in horizontal position above a supporting surface, an adjustable yoke including hook members suspended from the said frame and occupying the area defined thereby, the means of adjustment of the said yoke comprising bolt and nut assemblies joining the sections thereof so as to enable the said yoke to be clamped thereby on a golf bag, and clamping members for holding the said yoke in position on the said frame, said clamping members comprising vertical bars reciprocally positioned in the said frame, outturned and downturned upper end portions on the said bars for engaging portions of the said yoke and springs positioned about the lowermost portions of the said bars normally biasing the said bars downwardly toward the said frame.

ZINGEL C. BIRNBERG.

REFERENCES CITED

The following references are of record in the file of this patent:

UNITED STATES PATENTS

| Number | Name | Date |
|---|---|---|
| 436,373 | McDonna | Sept. 16, 1890 |
| 1,220,732 | Devlin | Mar. 27, 1917 |
| 1,303,691 | Tempt et al. | May 13, 1919 |
| 1,452,003 | Richardson | Apr. 17, 1923 |
| 1,675,362 | Ledyard et al. | July 3, 1928 |
| 1,744,414 | Pflaum | Jan. 21, 1930 |
| 2,040,339 | Ross | May 12, 1936 |
| 2,131,673 | Robinson | Sept. 27, 1938 |
| 2,260,676 | Lafaye, Sr. | Oct. 28, 1941 |
| 2,287,133 | Reiter | June 23, 1942 |
| 2,425,688 | Schulte | Aug. 12, 1947 |

FOREIGN PATENTS

| Number | Country | Date |
|---|---|---|
| 267,423 | Great Britain | Mar. 17, 1927 |